Patented Nov. 29, 1949

2,489,880

UNITED STATES PATENT OFFICE 2,489,880

AMINO ACID COMPOSITIONS AND THEIR PREPARATION

David B. Hand, Scarsdale, and John G. Brereton, Larchmont, N. Y., and Oliver W. Kaufmann, Hartford, Conn., assignors to Sheffield Farms Company, Inc., New York, N. Y., a corporation of New York No Drawing. Application May 11, 1945, Serial No. 593,334

4 Claims. (Cl. 195—29)

This invention relates to amino acid-containing compositions suitable for oral administration. It relates particularly to the production of amino acid-containing compositions from milk proteins by hydrolysis, digestion or splitting of the proteins, and to such compositions.

In general, amino acid-containing protein hydrolysates are manufactured either by hydrolyzing the protein in the presence of an acid, or by hydrolysis of the protein in the presence of an enzyme. The method involving the use of an acid results in the production of a composition that has a pleasant flavor and contains all of the amino acids essential to supply all of the requirements of the nitrogen metabolism of the human body, except tryptophane. Inasmuch as such compositions are lacking in tryptophane, they are not as desirable therapeutically as the compositions that are produced by digesting the protein with an enzyme. Such enzyme digested or hydrolyzed proteins contain all of the essential amino acids, including tryptophane, as well as other nonessential amino acids.

The principal disadvantage of the enzyme hydrolyzed protein compositions is the bitter taste that characterizes these compositions. While compositions of this latter type are suggested as being suitable for oral administration, as a practical matter, it is almost impossible to mask the bitter and lingering flavor of the composition. As a consequence, many attempts have been made to improve the flavor of the enzyme hydrolysates.

One suggestion has been to utilize three times as much of the enzyme (pancreatic gland) as the casein. The resulting product contains a relatively large proportion of a pancreas autolysate. Due to the relatively high cost of pancreatic gland and the large quantity of the gland present, the product is relatively expensive and it has a muscular hog-like flavor that is not entirely pleasant, although it is less objectionable than the bitter flavor that characterizes casein hydrolysates containing a relatively smaller proportion of an enzyme.

An object of the present invention is to provide a milk protein hydrolysate containing all of the essential amino acids and which is free from bitter or unpleasant flavor.

Another object of the present invention is to prepare milk protein hydrolysates that contain all of the essential amino acids and have a flavor that renders them suitable for oral administration.

A further object of the invention is to prepare bland enzyme hydrolysates of milk proteins in which relatively small quantities of enzyme are required for hydrolysis of the proteins.

An additional object of the invention is to produce a bland enzyme hydrolysate of milk proteins at relatively low cost.

Other objects of the present invention will become apparent from the following description of typical methods and products embodying the present invention.

The above noted objects of the invention have been attained by digesting the heat coagulable proteins present in whey with suitable enzymes, preferably the pancreatic gland enzymes.

More particularly, acid whey, such as, for example, acid casein whey, a by-product of the production of acid precipitated casein from skim milk, or acid cheese whey, a by-product of the manufacture of cheese, is heated for about fifteen minutes or longer in order to coagulate the lactalbumin and lactoglobulin therein. The heating of the whey can be accomplished satisfactorily in many different ways. For example, the whey may be heated by injecting steam directly into it or by heating it in a jacketed kettle or tank. Any continuous heating procedure that is capable of raising the temperature of the whey to at least 140° F. is satisfactory. After coagulation of the whey proteins, the whey is filtered to remove the coagulated material as filter cake. This cake is washed to remove liquid impurities without dissolving the protein in the cake.

The filter cake may then be treated to prevent decomposition, for example, by air drying it at a relatively low temperature (up to about 150° F.), by freezing it, or by mixing it with a preservative such as toluene. The dried product may be milled to reduce it to a relatively small particle size. The protein is then dispersed in the water and the dispersion adjusted substantially to neutrality, that is, to a pH value between about 6.5 and 7.5 with an alkaline compound, such as, soda ash.

Finely macerated hog pancreas gland is then added to the substantially neutral dispersion and the proteins are digested for a period of four to ten days. At the end of this period, the enzyme is inactivated by heating to between about 180° F. and boiling. The enzyme may be inactivated by heating the dispersion at a low temperature (about 140° F.) for a prolonged period of time or for a short time at a temperature above boiling. The dispersion may then be clarified and filtered to produce a clear filtrate. The filtrate is concentrated, preferably under vacuum and then is dried under vacuum on a roll or in any other desired way to produce a light tan colored powder.

If desired, this material may be further sieved or milled in order to pass through a 40 mesh screen.

A specific example of the process consists of boiling casein whey for about fifteen minutes at about the isoelectric point of casein, that is, a pH value of 4.5, to coagulate the desirable whey proteins in a form such that they can be removed by filtration with a plate and frame filter press. In order to assure a clean separation of the coagulated proteins, the filter cloths are preferably precoated with a filter aid such as "Super-Cel." About .075 pound of "Super-Cel" per square foot of filtering area is satisfactory to remove the coagulated protein without rendering filtration slow and difficult.

The filter press cake containing the coagulated proteins is then washed with sufficient water to remove substantially all of the lactose and milk salts. Solution of the protein is prevented by adjusting the water to a pH value of about 4.5 by the addition of 25 cc. of concentrated hydrochloric acid per hundred gallons of water.

After washing the filter press cake, it is air dried at about 150° F. and milled in order to reduce it to about 40 mesh or smaller.

The yield of coagulated, dried protein per hundred pounds of whey is about .45 to .50 pound. This yield is about 80 to 90% of theoretical.

The finely divided protein is dispersed in water in the proportion of about 6 pounds of protein to 100 pounds of water. The dispersion has a pH value of about 4.2 to 4.6. Inasmuch as the enzyme used has its optimum activity under substantially neutral conditions, about .2 pound of commercial soda ash is added to each hundred pounds of solution. Additional soda ash may be added, if necessary, to adjust the pH value of the dispersion to about 7.0. In order to produce a more homogeneous dispersion of the protein, the dispersion is heated to about 180° F. and held for a period of about thirty minutes after which it is cooled to about 120° F. The pH value is again adjusted to within the range of 6.8 to 7.2, if necessary. The substantially neutral dispersion is then digested with finely macerated hog pancreas gland in the proportion of about .6 pound of the gland for each 6 pounds of protein. A suitable preservative may be added to prevent putrefaction, for example, about .1 gallon each of nitration grade toluene and technical chloroform per hundred gallons of liquid digest.

The dispersion is maintained at between about 110° F. and 115° F. for a period of six days, at the end of which time the formol titre per cubic centimeter of the liquid digest will be about 2.7 to 3.0. At the end of the first twenty-four hours the pH value may be adjusted to about 6.5 with soda ash.

Following the digestion of the protein, the digest is boiled for at least five minutes in order to inactivate the enzyme and to remove the preservatives. The digest may be clarified by adding about 5 pounds of an activated carbon, such as "Nuchar," per hundred gallons of the dispersion prior to boiling. The dispersion is then filtered through a plate and frame type of filter press in which the filter cloths have been precoated with about .07 pound of "Super-Cel" per square foot of filtering area.

The resulting filtrate is crystal clear and has a light amber color. This filtrate is then concentrated under vacuum to about 40% solids and the concentrated filtrate is then vacuum roll dried to produce a light tan colored product.

Satisfactory drying is obtained with a roll speed of about five revolutions per minute at a roll steam temperature equivalent to 3 to 5 pounds steam pressure per square inch and under a vacuum of 28 to 29 inches.

The resulting flaky product may then be sieved or milled to pass 100% through a 40 mesh screen.

Typical products produced in the manner described above have the following composition:

Moisture—6%
Nitrogen (moisture-free basis)—12.3%
Amino nitrogen (moisture-free basis)—5%
Amino nitrogen (as percentage of total nitrogen)—42.3%
Ash—5.6%
Chloride—1%
pH (2% solution at 77° F.)—6.2
Solubility:
    1%—soluble at 77° F.
    2%—slightly insoluble at 77° F.
    2%—soluble at 100° F.
    5%—partly soluble at 100° F.
    5%—soluble at 140° F.
Color (powder)—light tan.

Typical samples of the above described product contain the following amino acids in about the quantities indicated:

| Amino acid: | Per cent |
|---|---|
| Cystine | 2.5 |
| Methionine | 3.0 |
| Arginine | 3.5 |
| Histidine | 1.5 |
| Lysine | 5.9 |
| Tyrosine | 3.7 |
| Tryptophane | 1.8 |
| Phenylalanine | 5.0 |
| Threonine | 4.5 |
| Valine | 4.2 |
| Leucine | 16.8 |
| Isoleucine | 4.4 |

As indicated in the above table, the product contains a mixture of amino acids, including all of the essential amino acids, in well balanced proportions and thus is entirely satisfactory for supplying all the nitrogen required for the nitrogen metabolism of the human body. The flavor of the product is as good as or better than the amino acid compositions prepared by the acid hydrolysis of proteins and is superior to any amino acid compositions heretofore prepared by the enzyme digestion of milk proteins.

The improved flavor of the new product is believed to arise from the substantial freedom of the product from calcium salts and other calcium compounds. Substantial quantities of calcium salts and other calcium compounds are present in casein. The casein hydrolysates have a bitter flavor.

Other protein compositions, such as the limed proteins used for animal feed, and produced by treatment of casein whey with lime, also have a bitter flavor after being hydrolyzed or digested with enzymes.

On the contrary, when the whey proteins are precipitated by heating, they are substantially free from calcium salts or other calcium compounds and their hydrolysates are free from bitter flavor. Thus, it appears that the calcium compounds are a source of the bitter flavor of the prior milk protein enzyme hydrolysates.

Other factors that may contribute to the improved flavor of the new product are the use of pancreatic gland as the source of enzymes for digestion of the protein and the prolonged digestion period.

When trypsin, alone, is used as the enzyme, the flavor of the product is not as good as when pancreatic gland is used. It appears that the protein is more completely split into amino acids when pancreatic gland is used for the reason that the gland contains additional proteases and that a prolonged digestion period also aids in the reduction of the complex proteins to less complex compounds. As a result, there are fewer of the more complex compounds present in the product that could impart a bitter flavor to the product. However, the desirable flavor is not entirely due to the use of the pancreatic enzymes and prolonged digestion periods inasmuch as casein hydrolysates prepared with pancreatic gland have a pronounced bitter flavor.

The product can be manufactured inexpensively inasmuch as it is derived from a by-product which has had little other use than as a source as animal feed, lactose or lactic acid. By coagulating the proteins, the remaining whey product is rendered more suitable for the production of lactose and lactic acid, but its value as animal feed is impaired. However, the protein material, that can be coagulated by means of lime and heat, still can be used for the preparation of animal feed when other less expensive protein materials which supply the ingredients removed by heat coagulation are added. Thus, the whey provides a very inexpensive source of protein and inasmuch as the product requires a relatively small amount of enzyme for digestion, it can be prepared at relatively low cost.

It will be understood that the method is susceptible to modification in the temperatures and pH values used in some of the steps, as indicated above, and that various steps of the method may well be combined into a single step without departing from the invention. Therefore, the typical method and product described herein should be considered as illustrative of the invention and not as limiting the scope of the following claims.

We claim:

1. A method of preparing amino acid-containing compositions comprising heating acid whey having a pH value of about 4.5 to at least 140° F. to coagulate proteins therein, separating the coagulated proteins from said whey, dispersing said proteins in water, adjusting the pH value of the dispersion to between about 6.8 and 7.2, digesting said dispersion with the proteolytic enzymes in macerated pancreas at a temperature of about 110 to 115° F. for several days, then heating the digested dispersion to inactivate said enzymes, separating the liquid from any solids present in said digested dispersion, and concentrating said liquid.

2. A method of preparing amino acid-containing compositions comprising heating acid whey having a pH value of about 4.5 to at least 140° F. to coagulate protein therein, separating the coagulated protein from said whey, drying and milling the coagulated protein to reduce it to finely divided condition, dispersing the finely divided protein in water, substantially neutralizing said dispersion, digesting said dispersion with the enzymes of macerated pancreas at a temperature of about 110 to 115° F. for several days, then heating the dispersion to inactivate said enzymes, separating the liquid from any solids present in said digested dispersion, and concentrating said liquid.

3. A method of preparing amino acid-containing compositions comprising heating acid whey having a pH value of about 4.5 to at least 140° F. to coagulate protein therein, separating the coagulated protein from said whey, drying and milling the coagulated protein to reduce it to finely divided condition, dispersing said finely divided protein in water, substantially neutralizing said dispersion, digesting said dispersion with the enzymes of macerated pancreas at a temperature of about 110 to 115° F. for several days, then heating the dispersion to inactivate said enzymes, separating the liquid from any solids present in said digested dispersion, concentrating said liquid to dryness and reducing the resulting product to a finely divided state.

4. An amino acid composition containing all of the essential amino acids, said composition being free from bitter taste, having a solubility in water at room temperature of greater than 1% and made in accordance with the method set forth in claim 3.

DAVID B. HAND.
JOHN G. BRERETON.
OLIVER W. KAUFMANN.

REFERENCES CITED

The following references are of record in the file of this patent:

UNITED STATES PATENTS

| Number | Name | Date |
| --- | --- | --- |
| 2,180,637 | Kemmerer | Nov. 21, 1939 |
| 2,364,008 | Stuart | Nov. 28, 1944 |

OTHER REFERENCES

Industrial & Engineering Chemistry, vol. 26, No. 8, page 822.